United States Patent Office 3,337,547
Patented Aug. 22, 1967

3,337,547
N-(DILOMER ALKYL PIPERIDINO AND MORPHOLINO) - 2,4 - DICHLORO - 5 - SULPHAMYL BENZOIC ACID AMIDES
Ernst Jucker, Ettingen, and Adolf J. Lindenmann, Basel, Switzerland, assignors to Sandoz Ltd. (also known as Sandoz A.G.), Basel, Switzerland
No Drawing. Filed Dec. 15, 1964, Ser. No. 418,566
Claims priority, application Switzerland, Dec. 20, 1963, 15,708/63
3 Claims. (Cl. 260—247.1)

The present invention relates to new heterocyclic compounds and a process for their production.

The present invention provides heterocyclic compounds of Formula I,

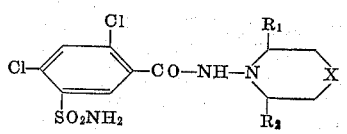

(I)

in which X signifies an oxygen atom or the methylene radical, and each of $R_1$ and $R_2$ signifies a lower alkyl radical.

As used herein the phrase "lower alkyl" designates such radicals of from 1 to 4 carbon atoms inclusive.

The present invention further provides a process for the production of the above Compounds I, characterized in that a 2,4-dichloro-5-sulphamyl-benzoic acid halide of Formula II,

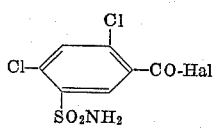

(II)

in which Hal signifies a chlorine or bromine atom, is reacted with an amine of Formula III,

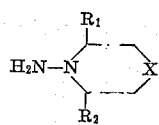

(III)

in which X, $R_1$ and $R_2$ have the above significance.

One method of effecting the process of the present invention is as follows: A 2,4-dichloro-5-sulphamyl-benzoic acid halide II is added to a solution of an amine III in an inert organic solvent, e.g. chloroform. In order to bind the hydrogen halide liberated during the ensuing condensation, a tertiary organic base (e.g. triethyl amine) is added to the reaction mixture or an excess of Compound III may be used. The reaction mixture is stirred for several hours at room temperature or slightly above to complete the reaction. The solvent is then distilled off, the residue is taken up in an organic solvent, e.g. ethyl acetate, the resulting solution is washed with water and subsequently dried. The residue remaining after evaporation of the solvent is purified in manner known per se, e.g. by crystallization or chromatography on aluminium oxide.

It is advantageous to use as the 2,4-dichloro-5-sulphamyl-benzoic acid halide the acid chloride, although the acid bromide may likewise be used. The 2,4-dichloro-5-sulphamyl-benzoic acid chloride, a new compound which forms part of the present invention, is best obtained by heating 2,4-dichloro-benzoic acid with chlorosulphonic acid, reacting the resulting 2,4-dichloro-5-chlorosulphonyl-benzoic acid with aqueous or alcoholic ammonia solution to give the corresponding sulphamyl compound and subsequently converting the 2,4-dichloro-5-sulphamyl-benzoic acid into the corresponding substituted benzoic acid chloride II by reaction with thionyl chloride.

Compounds of Formula A,

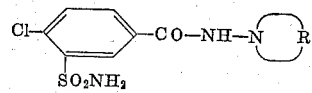

in which the radical

signifies a monocyclic heterocycle containing nitrogen, e.g. the radical

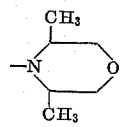

or

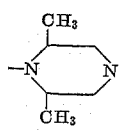

have been described previously and are said to have marked diuretic properties; in particular one of these compounds, viz. Brinaldix (Reg. Trademark), is widely used in medicine as a diuretic. It is therefore surprising that the compounds of the present invention, as opposed to the previously described compounds of Formula A, have only a weak or insignificant diuretic effect, but have a pronounced antihypertensive effect. For example, when conscious hypertensive rats are given a dose of 20 mg./kg. of N - [3,5 - dimethyl - morpholinyl - (4)] - 2,4 - dichloro-5-sulphamyl-benzoic acid amide, which is especially effective, by subcutaneous administration, a prolonged blood pressure reduction is obtained. The toxicity of the compounds of the invention is very low, as may be seen by the fact that the $DL_{50}$ value (acute toxicity) for mice and rats has the order of magnitude of g./kg.

The introduction of a second chlorine atom in the molecule of the previously described Compounds A represents a trivial change in view of their otherwise complex structure. In view of the close chemical relationship of said compounds of Formula A and the compounds of the present invention one would have expected the latter to have pharmacological properties somewhat similar to those of the former, possibly with some modification in the magnitude and the radical change in the spectrum of activity actually observed is highly surprising.

The compounds of the present invention are indicated for use in the treatment of hypertonia, N-[3,5-dimethyl-morpholinyl - (4)] - 2,4 - dichloro - 5 - sulphamyl - benzoic acid amide being especially interesting for this purpose.

The compounds of the invention are indicated for use as pharmaceuticals on their own or in the form of suitable medicinal preparations for administration, e.g. enterally or parenterally. In order to produce such medicinal preparations the compounds are worked up with inorganic or organic adjuvants which are inert and physiologically acceptable. Examples of such adjuvants are as follows:

Tablets and dragées: lactose, starch, talc and stearic acid;
Syrups: solutions of cane sugar, invert sugar and glucose;
Injectable solutions: water, alcohols, glycerin and vegetable oils;
Suppositories: natural or hardened oils and waxes.

The preparations may furthermore contain suitable preserving, stabilizing and wetting agents, solubilizers, sweetening and colouring substances or flavourings.

The present invention therefore also provides pharmaceutical compositions containing, in addition to a physiologically acceptable carrier, a compound of Formula I above.

In the following nonlimitative examples all temperatures are stated in degrees centigrade; the melting points are uncorrected.

*Example 1.—N-[2,6-dimethyl-piperidyl-(1)]-2,4-dichloro-5-sulphamyl-benzoic acid amide.*

(a) *2,4-dichloro - 5-chlorosulphonyl-benzoic acid.*—A mixture of 95.5 g. of 2,4-dichloro-benzoic acid and 261.0 g. of chlorosulphonic acid is heated to 130° for 10 hours. The resulting dark solution is cooled to room temperature and poured onto 750 g. of ice, whereby 2,4-dichloro-5-chlorosulphonyl-benzoic acid precipitates. The precipitate is filtered off, dissolved in ether, some water is removed and the ether solution is dried over magnesium sulphate. On concestrating the ethereal solution 2,4-dichloro-5-chlorosulphonyl-benzoic acid precipitates in crystalline form. After recrystallizing from ether/petroleum ether the compound melts at 191–192°.

(b) *2,4-dichloro-5-sulphamyl-benzoic acid chloride.*—100 cc. of a 20% ethanolic ammonia solution are slowly added dropwise whilst stirring to a suspension of 11.6 g. of 2,4-dichloro-5-chlorosulphonyl-benzoic acid in 10 cc. of ethanol at such a rate that the temperature does not rise above 40°. Stirring is subsequently effected for a further 2 hours at room temperature, the reaction mixture is evaporated to dryness in a vacuum, triturated with 200 cc. of ether, filtered, dried well in a vacuum, and 23 g. of thionyl chloride are added to the residue. Heating is effected to 100° for one hour, evaporation to dryness is effected in a vacuum, the residue is boiled twice, each time with 100 cc. of benzene and the undissolved substance is each time filtered off. The combined benzene extracts are concentrated and cooled, whereby 2,4-dichloro-5-sulphamyl-benzoic acid chloride precipitates in crystalline form. After recrystallizing from benzene or ethyl acetate/petroleum ether the compound melts at 172–173°.

(c) *N-[2,6 - dimethyl-piperidyl-(1)] - 2,4-dichloro-5-sulphamyl-benzoic acid amide.*—8.6 g. of 2,4-dichloro-5-sulphamyl-benzoic acid chloride are added to a solution of 4.3 g. of 1-amino-2,6-dimethyl-piperidine and 3.0 g. of triethylamine in 150 cc. of chloroform whilst stirring at 20–25° during the course of 20 minutes and the reaction solution is subsequently stirred for a further 48 hours at room temperature. Subsequently evaporation to dryness is effected in a vacuum, the residue is taken up in 200 cc. of ethyl acetate and washed with a total of 100 cc. or water. After drying over magnesium sulphate the solvent is distilled off in a vacuum and the residue chromatographed on aluminium oxide, whereby the compound is eluted with a solvent mixture of chloroform/methanol (9:1). The analytically pure N-[2,6-dimethyl-piperidyl - (1)] - 2,4-dichloro-5-sulphamyl-benzoic acid amide obtained after recrystallization from chloroform/methanol and washing with ether melts at 262–265°.

*Example 2.—N-[3,5-dimethyl-morpholinyl-(4)]-2,4-dichloro-5-sulphamyl-benzoic acid amide*

8.6 g. of 2,4-dichloro-5-sulphamyl-benzoyl chloride are added in portions during the course of 20 minutes whilst stirring at 20–25° to a solution of 3.9 g. of 3,5-dimethyl-4-amino-morpholine and 3.0 g. of triethyl amine in 150 cc. of chloroform and the reaction mixture is subsequently stirred for a further 60 hours at room temperature. Evaporation to dryness is then effected in a vacuum, the residue is taken up in 200 cc. of ethyl acetate and washed with 100 cc. of water. After drying over magnesium sulphate the ethyl acetate is distilled off in a vacuum and the residue chromatographed on aluminium oxide, whereby N-[3,5-dimethyl-morpholinyl-(4)]-2,4-dichloro-5-sulphamyl-benzoic acid amide is eluted with a solvent mixture of chloroform/methanol (9:1). After recrystallization from chloroform/methanol the compound melts at 270–272°.

What is claimed is:
1. A compound of the formula

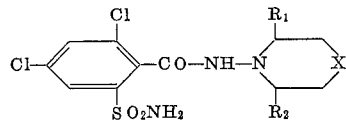

wherein X signifies a member selected from the group consisting of oxygen and methylene, and each of $R_1$ and $R_2$ is lower alkyl.

2. N-[2,6-dimethyl-piperidyl - (1)]-2,4-dichloro-5-sulphamyl-benzoic acid amide.

3. N-[3,5-dimethyl-morpholinyl - (4)]-2,4-dichloro-5-sulphamyl-benzoic acid amide.

References Cited

UNITED STATES PATENTS 3,043,874   7/1962   DeWald et al. ____ 260—293.47
3,055,905   9/1962   Graff et al. _____ 260—293.47

ALEX MAZEL, *Primary Examiner.*

JOSE TOVAR, *Assistant Examiner.*

UNITED STATES PATENT OFFICE
CERTIFICATE OF CORRECTION

Patent No. 3,337,547　　　　　　　　　　August 22, 1967

Ernst Jucker et al.

It is hereby certified that error appears in the above numbered patent requiring correction and that the said Letters Patent should read as corrected below.

Column 4, lines 30 to 35, the formula should appear as shown below instead of as in the patent:

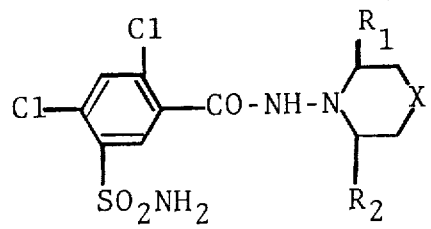

Signed and sealed this 16th day of July 1968.

(SEAL)
Attest:

Edward M. Fletcher, Jr.
Attesting Officer

EDWARD J. BRENNER
Commissioner of Patents